US007431647B1

(12) United States Patent
Marks et al.

(10) Patent No.: US 7,431,647 B1
(45) Date of Patent: Oct. 7, 2008

(54) METHOD OF PLAYING A SLOT MACHINE ("IN-A-ROW")

(76) Inventors: Daniel Mordecai Marks, 114 6th St. SE., Washington, DC (US) 20003; Anthony Mark Singer, 125 Burnt Meadow Rd., Ringwood, NJ (US) 07456; Howard Mitchell Marks, 209 Garth Rd., Scarsdale, NY (US) 10583

( * ) Notice: Subject to any disclaimer, the term of this patent is extended or adjusted under 35 U.S.C. 154(b) by 673 days.

(21) Appl. No.: 10/895,604

(22) Filed: Jul. 21, 2004

Related U.S. Application Data

(60) Provisional application No. 60/488,934, filed on Jul. 21, 2003.

(51) Int. Cl.
*A63F 13/00* (2006.01)
*A63F 9/24* (2006.01)
*G06F 17/00* (2006.01)
*G06F 19/00* (2006.01)

(52) U.S. Cl. ............................ 463/20; 463/16; 463/17; 463/18; 463/25

(58) Field of Classification Search ............. 463/16–22
See application file for complete search history.

(56) References Cited

U.S. PATENT DOCUMENTS 4,756,531 A * 7/1988 DiRe et al. .................... 463/18
5,769,716 A * 6/1998 Saffari et al. .................. 463/20
6,102,798 A * 8/2000 Bennett ....................... 463/16
6,174,235 B1 * 1/2001 Walker et al. ................. 463/25
6,254,481 B1 * 7/2001 Jaffe .......................... 463/20
6,464,581 B1 * 10/2002 Yoseloff et al. ............... 463/20
6,589,114 B2 * 7/2003 Rose .......................... 463/20
6,913,532 B2 * 7/2005 Baerlocher et al. ............ 463/16
6,964,416 B2 * 11/2005 McClintic et al. ........... 273/273
2003/0045345 A1 * 3/2003 Berman ....................... 463/20
2003/0216165 A1 * 11/2003 Singer et al. .................. 463/20
2004/0185927 A1 * 9/2004 Baerlocher et al. ............ 463/16

* cited by examiner

*Primary Examiner*—Robert Pezzuto
*Assistant Examiner*—Milap Shah

(57) ABSTRACT

The present invention includes a variety of methods to issue awards based upon the order of appearance of symbols in the symbol matrix. An "In-A-Row" embodiment of the present invention displays symbols in random positions of the symbol matrix and issues awards for three or more same symbols appearing in sequential order. For example, the first symbol displayed is an "A," the second symbol is a "B," and the third, fourth, fifth and sixth symbols are "C"s. The sequential appearance of four "C" symbols results in an In-A-Row award.

9 Claims, 11 Drawing Sheets

MARKS, ET AL

IN-A-ROW

MARKS, ET AL

IN-A-ROW

MARKS, ET AL

IN-A-ROW

MARKS, ET AL

IN-A-ROW

METHOD OF PLAYING A SLOT MACHINE ("IN-A-ROW")

PRIORITY CLAIM

This application is a non-provisional patent application that claims priority to and the benefit of U.S. Provisional Patent Application Ser. No. 60/488,934, filed Jul. 21, 2003, incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF THE INVENTION

In general, the present invention relates to methods of issuing slot machine awards and, more particularly, to awards based upon the order of appearance of symbols in the symbol matrix.

BACKGROUND OF THE INVENTION

To play a conventional slot machine, the player deposits money into the machine, sets the wager, spins the reels, and collects awards for winning symbol combinations appearing on selected pay lines, according to a pay schedule. Since conventional slot machines are limited to the foregoing methods, players, casinos, and manufacturers suffer.

Players grow bored of playing games using same method of play; casinos suffer from player dissatisfaction with the casino's game selection; casinos cannot distinguish their games from other casinos; and game manufacturers cannot distinguish their products from other manufacturers.

Slot manufacturers and casino operators, therefore, develop new methods to overcome these limitations. None of these methods, however, issue awards based upon the order of appearance of symbols in the symbol matrix. The full potential for slot machine awards, therefore, remains unrealized.

SUMMARY OF THE INVENTION

The present invention issues awards based upon the order of appearance of symbols in the symbol matrix. A preferred embodiment called "In-A-Row" issues awards for three or more same symbols appearing sequentially in the symbol matrix, as follows:

- All positions in the symbol matrix are blank;
- Symbols are randomly selected but not displayed;
- Symbols are randomly displayed one-at-a-time;
- Three or more same symbols displayed sequentially results in an award; and
- Symbols continue to appear one-at-a-time until the symbol matrix is complete.

The order of appearance of symbols in the symbol matrix, therefore, determines the amount of the award, if any. For example, the first symbol is "A," the second symbol is "B," and the third, fourth, fifth and sixth symbols are "C." The appearance of four sequential "C" symbols results in an In-A-Row award.

BRIEF DESCRIPTION OF THE DRAWINGS

The accompanying figures illustrate various stages of the preferred In-A-Row embodiment of the present invention.

DESCRIPTION OF A PREFERRED EMBODIMENT

Figure 1:
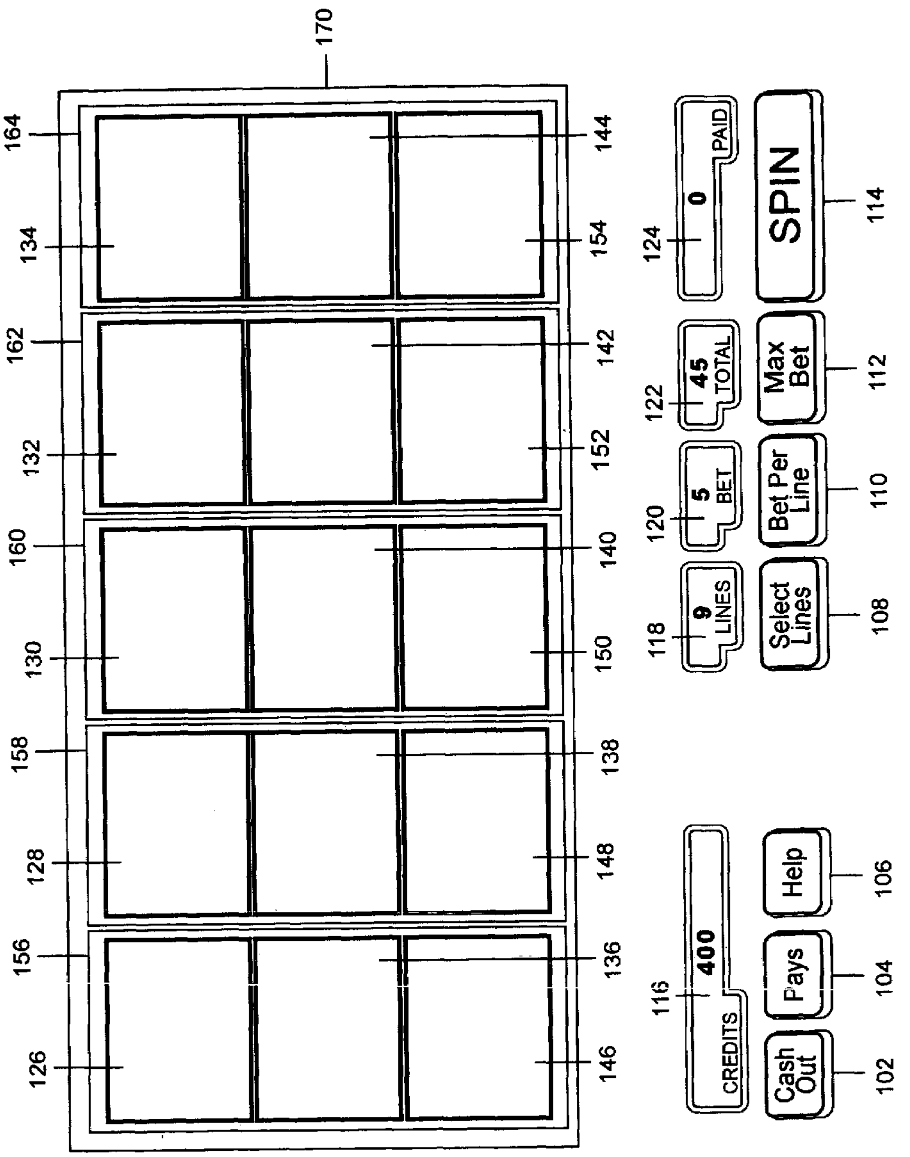
FIG. 1 shows a game screen before any symbols appear in the symbol matrix.

To play the In-A-Row embodiment, the player initializes credits, sets the wager, spins the reels, collects credits for In-A-Row awards during the spin, and also collects line pay and scatter pay awards after the spin, with all awards defined by a pay schedule, as detailed below with reference to FIGS. 1 through 10:

Initialize Credits. In FIG. 1, the player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, smart cards, or other form of electronic funds transfer.

Set the Wager. In FIG. 1, the player sets the wager by selecting pay lines and setting the bet per pay line. The wager is calculated by multiplying the number of selected pay lines by the bet per pay line. For example, the player may wager five credits on each of nine pay lines for a total bet of forty-five credits. The total bet amount is displayed on the Total Bet meter 122.

To select pay lines, the player uses the Select Pay Lines button 108 and views the number of selected pay lines on the Select Pay Lines meter 118. Pay lines are selected in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, up to five credits may be wagered on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any predetermined wager may be assigned a button.

Spin the Reels. In FIG. 1, the player uses the Spin button 114 to randomly rearrange the symbols displayed in the symbol matrix 170. The symbol matrix 170 contains three symbol positions for each of the five slot reels 156-164 for a total of fifteen symbol positions 126-154. Alternatively, any number of reels with any number of symbol positions may be used.

The slot reels 156-164 spin and randomly stop. The symbols, however, are not instantly displayed in the symbol positions 126-154. Symbols appear one-at-a-time until all fifteen symbol positions 126-154 are revealed. Alternatively, any size symbol matrix may be used and any method may be used to rearrange symbols in the symbol matrix.

In-A-Row Awards. In FIGS. 2 through 9, the player collects In-A-Row awards for sets of three or more same symbols appearing sequentially during the spin. In-A-Row awards are based solely upon the order of appearance in the symbol matrix 170; In-A-Row awards are not based upon the location of the symbols in the symbol matrix 170.

Figure 2:
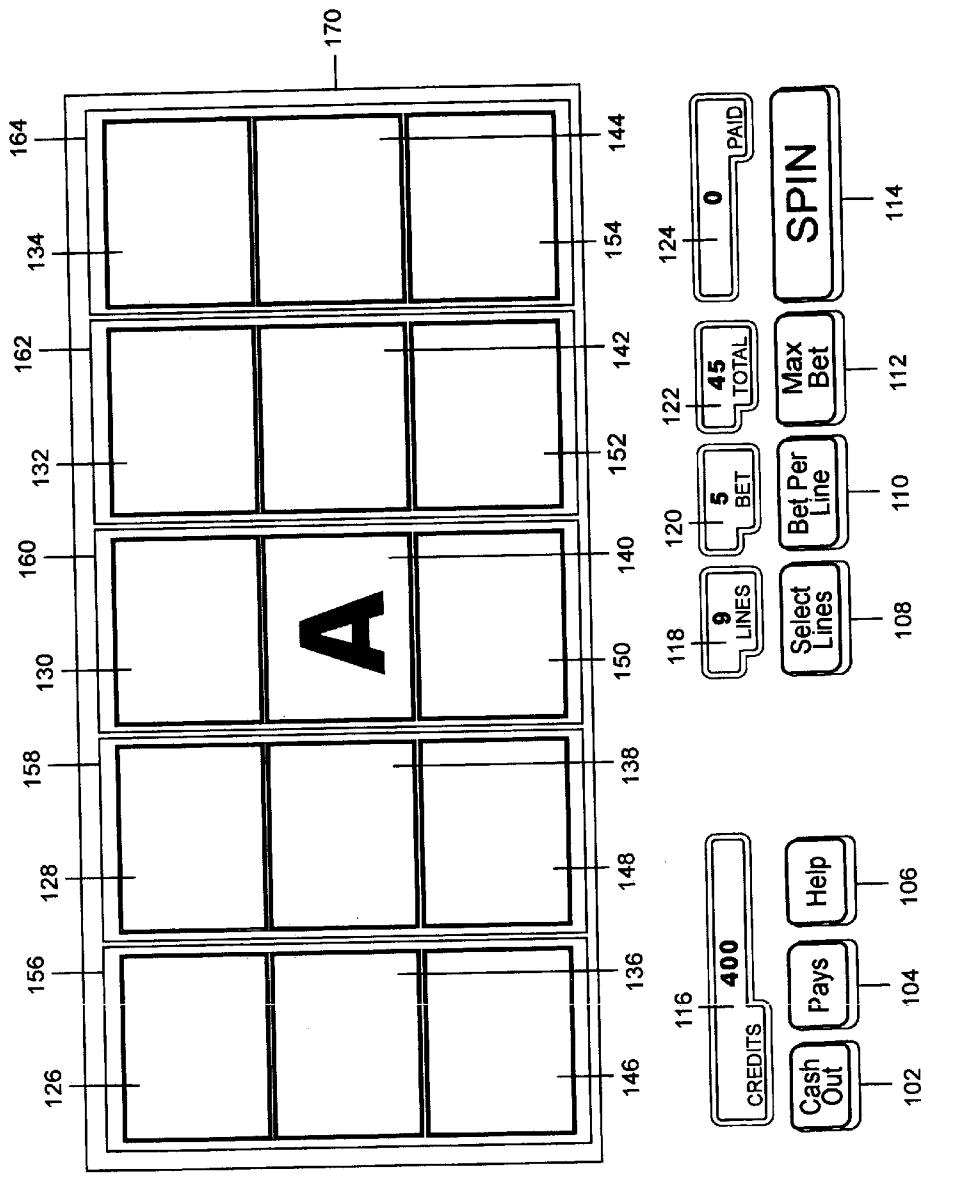
FIG. 2 shows a game screen with a first symbol in the symbol matrix.
Figure 3:
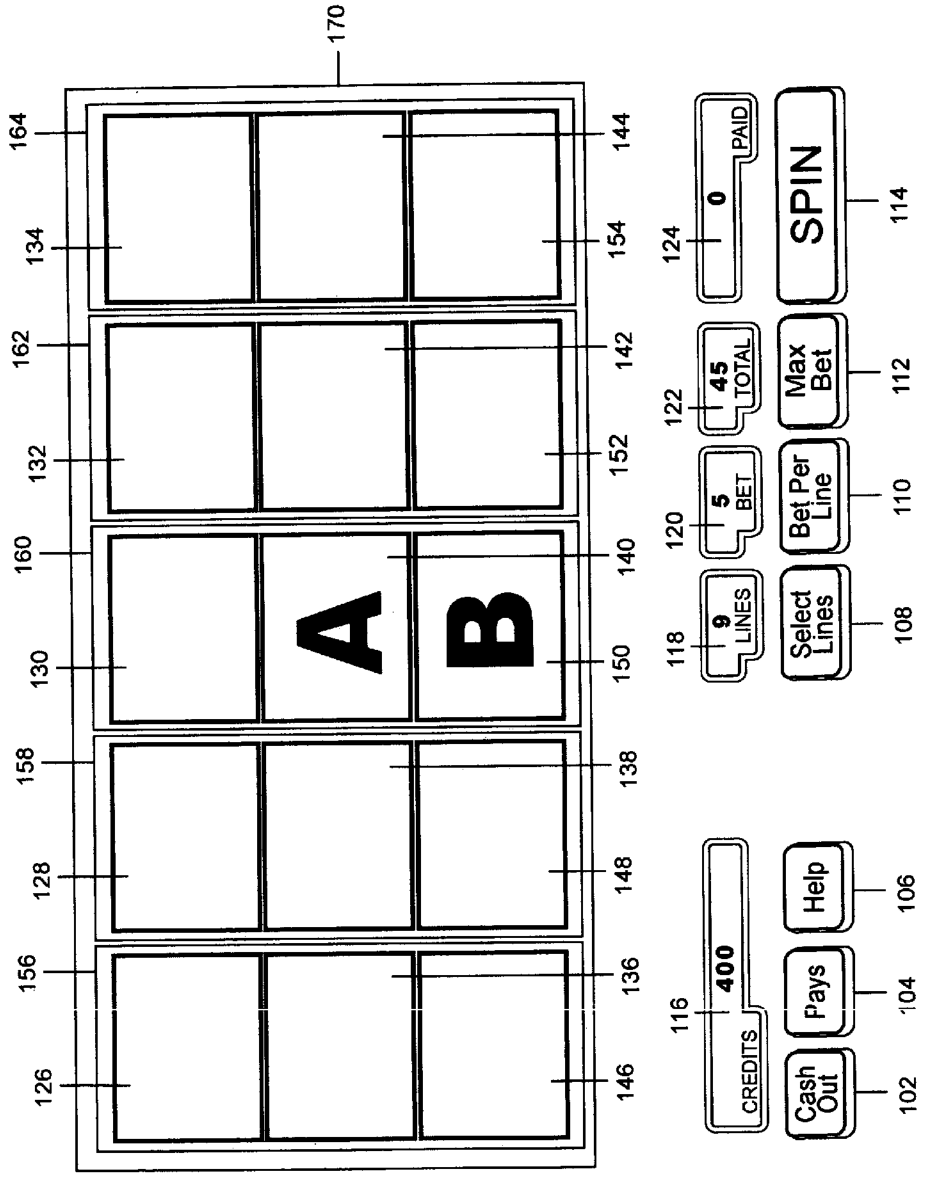
FIG. 3 shows a game screen with a second symbol in the symbol matrix.
Figure 4:
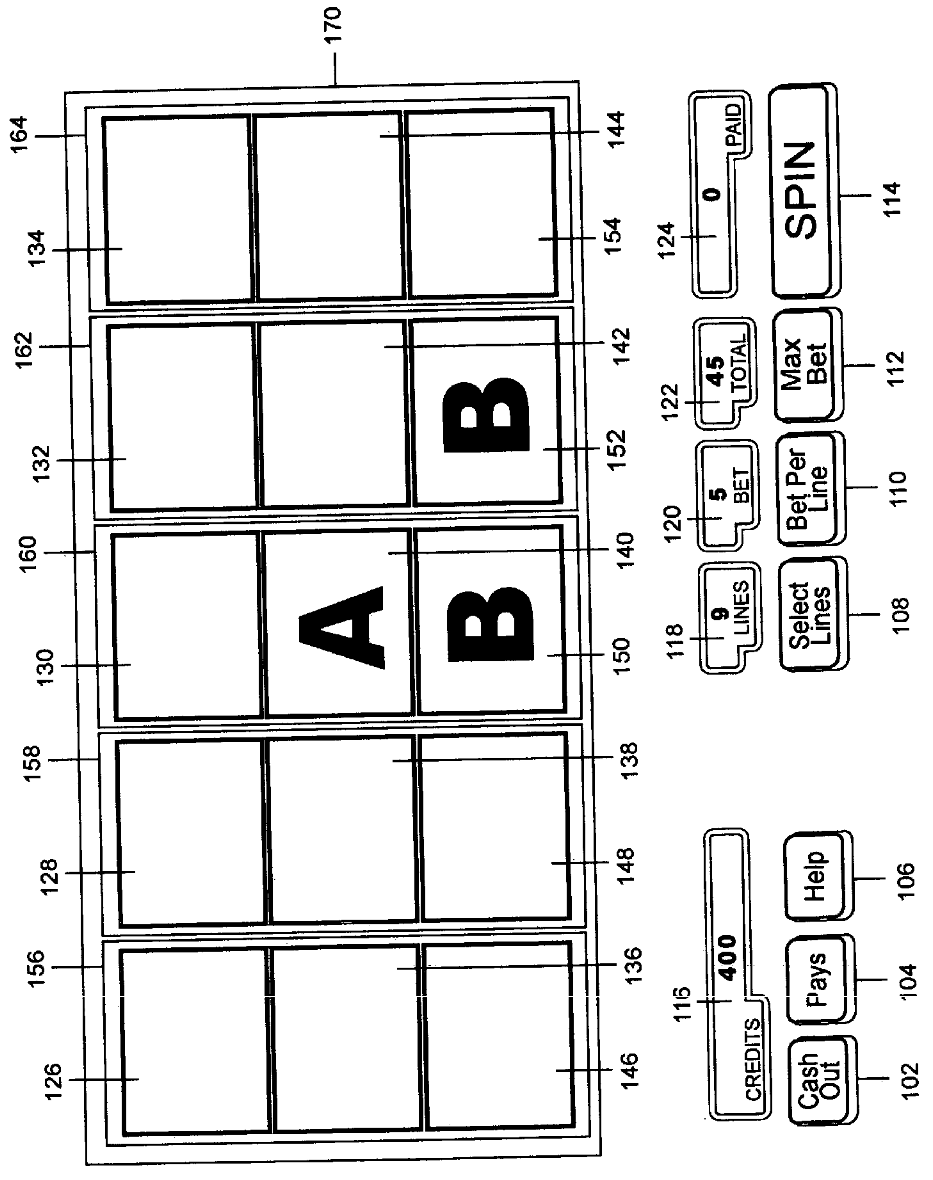
FIG. 4 shows a game screen with a third symbol in the symbol matrix.

In FIG. 2, the first symbol—"A" at 140—appears in the symbol matrix 170. In FIG. 3, the second symbol—"B" at 150—appears in the symbol matrix 170. In FIG. 4, the third symbol—"B" at 152—appears in the symbol matrix 170. The sequential appearance of two same symbols 150-152 triggers blinking indicators (not shown) around both same symbols 150-152. The game pauses to build anticipation for the appearance of the next symbol.

Figure 5:
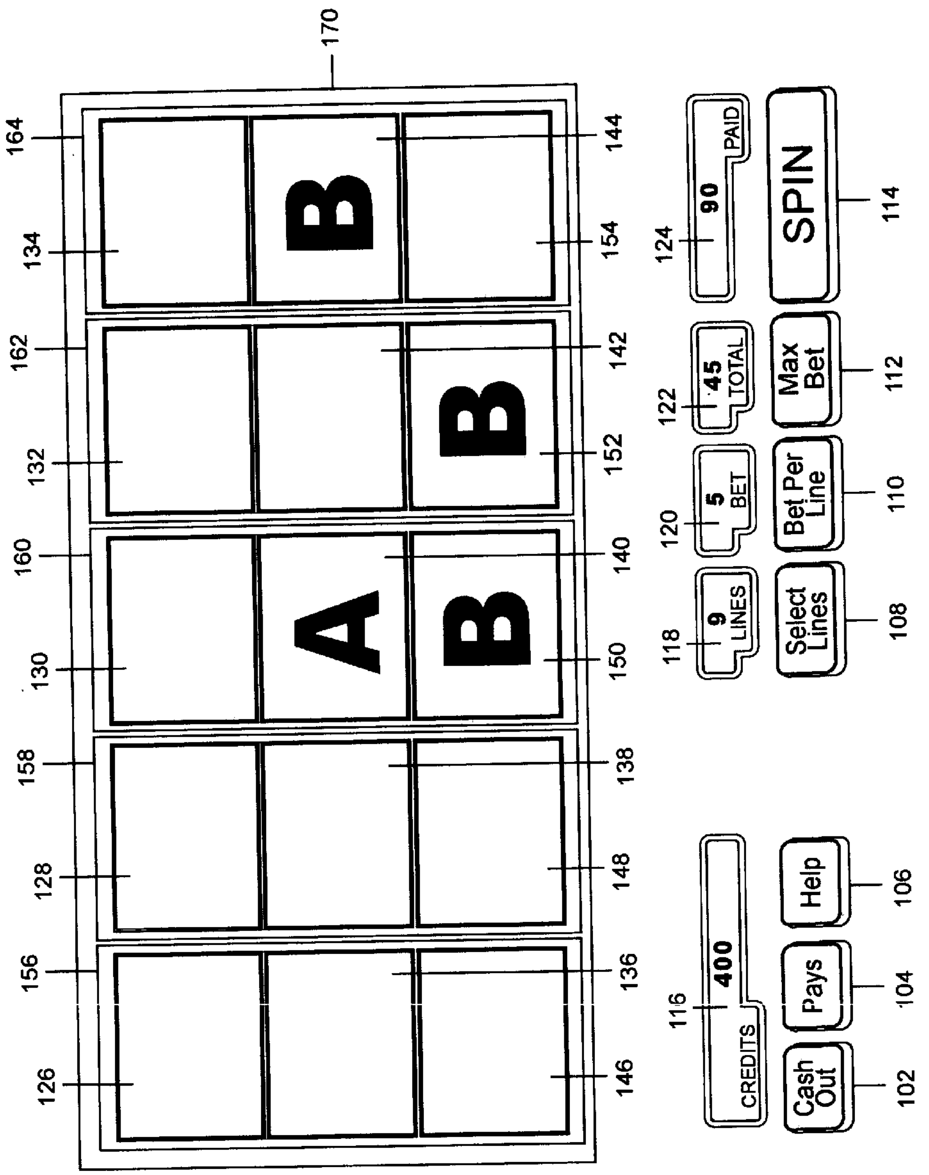
FIG. 5 shows a game screen with a fourth symbol in the symbol matrix.

In FIG. 5, the fourth symbol—"B" at 144—appears in the symbol matrix 170. The sequential appearance of three same symbols 144, 150-152 results in an In-A-Row award of 2× the total bet, as indicated by the Paid meter 124. Blinking indicators (not shown) appear around the all three same symbols 144, 150-152. The game pauses again to increase excitement for the next symbol.

Figure 6:
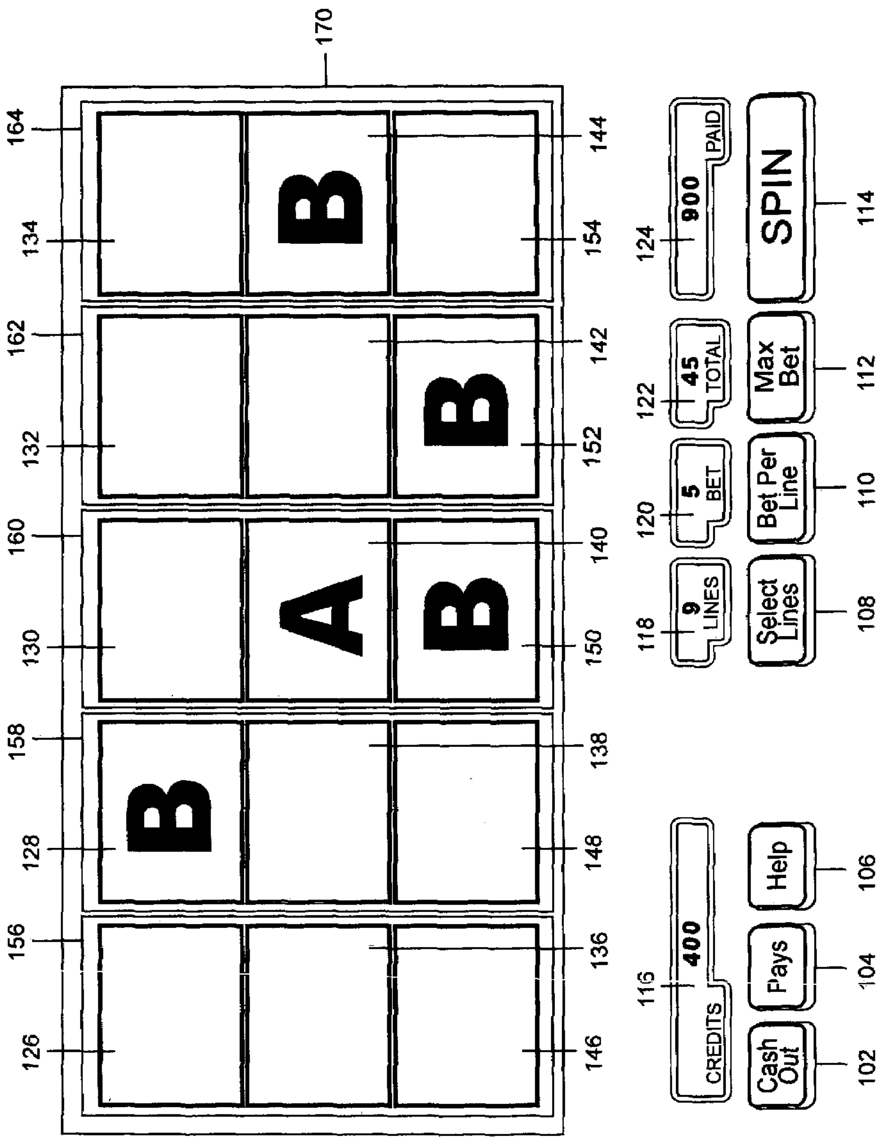
FIG. 6 shows a game screen with a fifth symbol in the symbol matrix.

In FIG. 6, the fifth symbol—"B" at 128—appears in the symbol matrix 170. The sequential appearance of four same symbols 128, 144, 150-152 results in an additional In-A-Row award of 18× the total bet, as indicated by the Paid meter 124. Blinking indicators (not shown) appear around all four same symbols 128, 144, 150-152. The game pauses again to focus the player on the potential award for five same symbols in-a-row.

Figure 7:
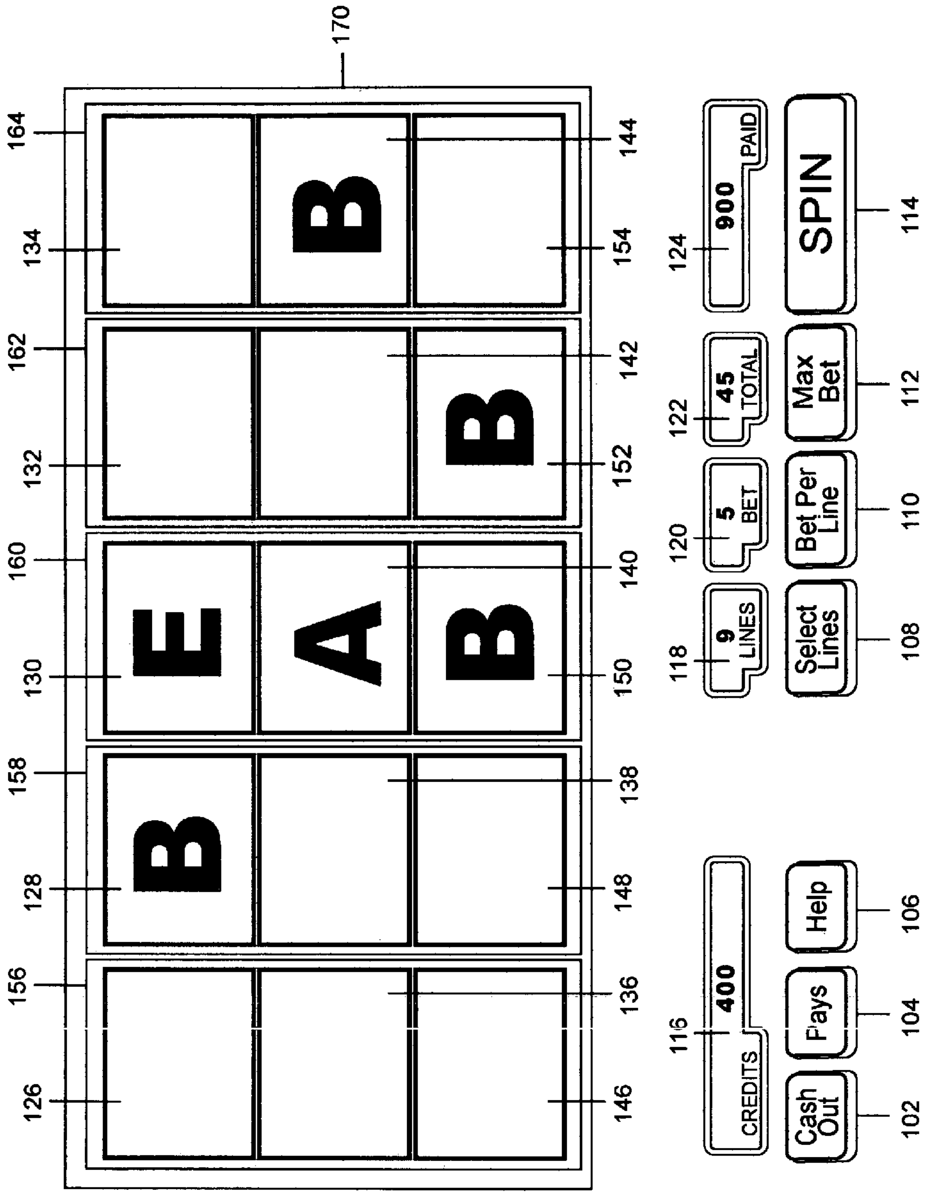
FIG. 7 shows a game screen with a sixth symbol in the symbol matrix.
Figure 8:
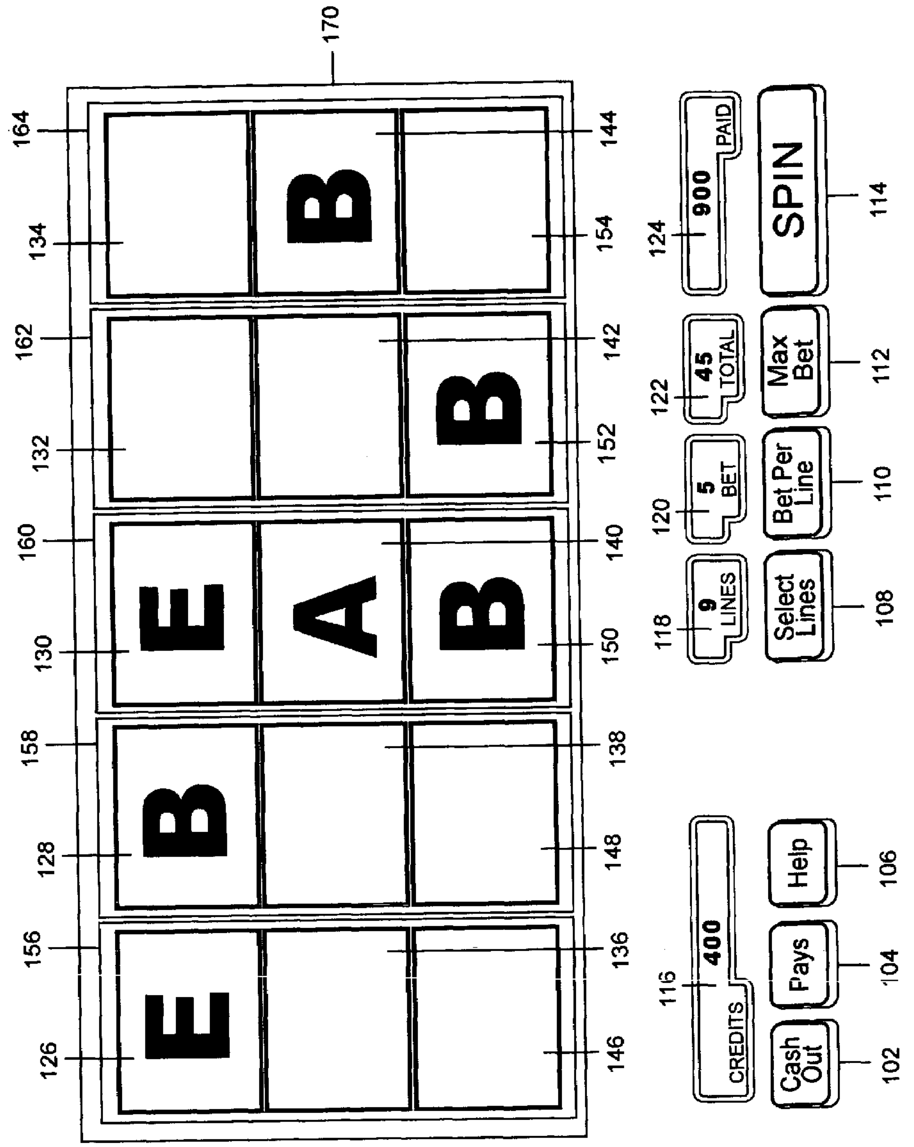
FIG. 8 shows a game screen with a seventh symbol in the symbol matrix.

In FIG. 7, the sixth symbol—"E" at 130—appears in the symbol matrix 170. The appearance of a different symbol 130 ends the streak at four same symbols 128, 144, 150-152 appearing sequentially. No award is issued and all of the blinking indicators (not shown) disappear. In FIG. 8, however, the seventh symbol—"E" at 126—appears in the symbol matrix 170. The sequential appearance of two same symbols 126, 130 triggers blinking indicators (not shown) around both same symbols 126, 130.

Figure 9:
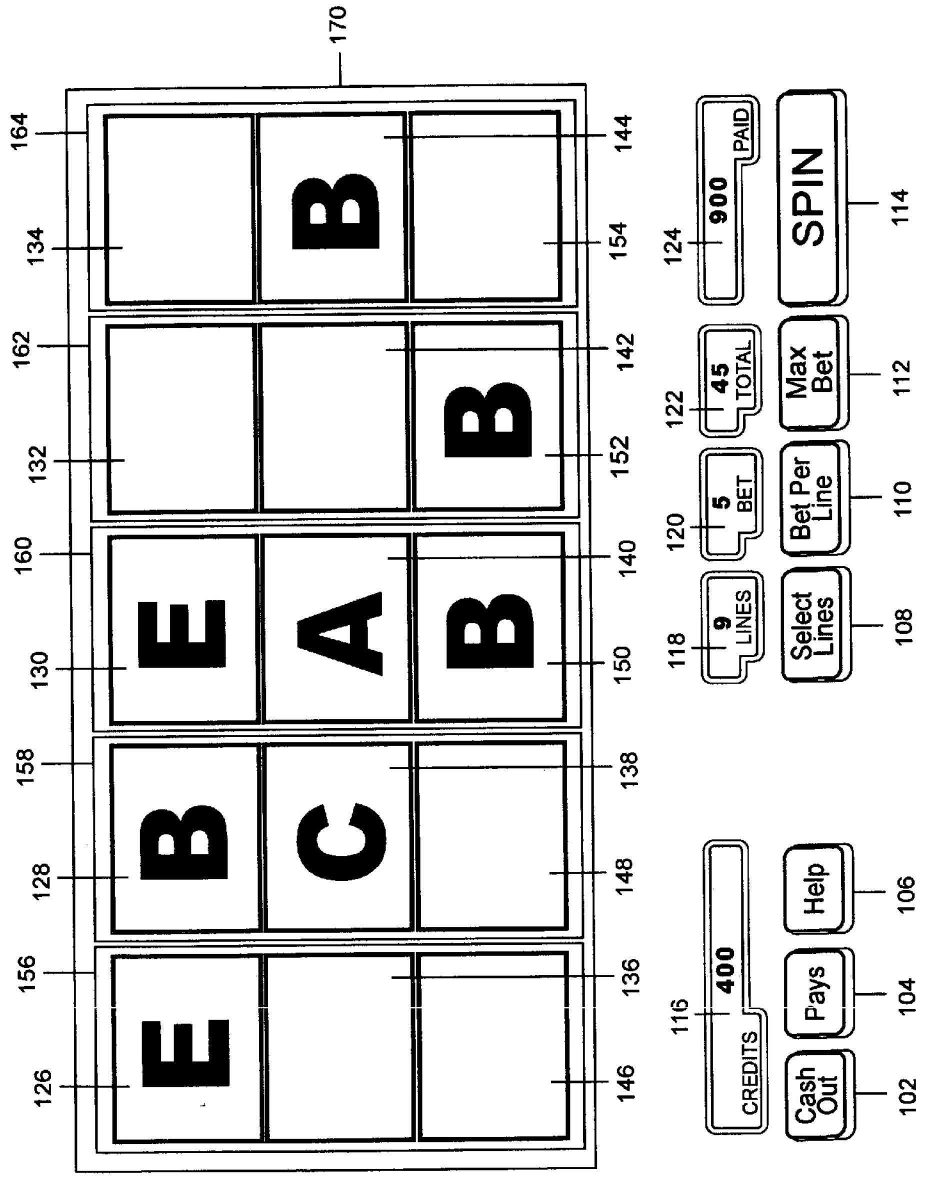
FIG. 9 shows a game screen with an eighth symbol in the symbol matrix.
Figure 10:
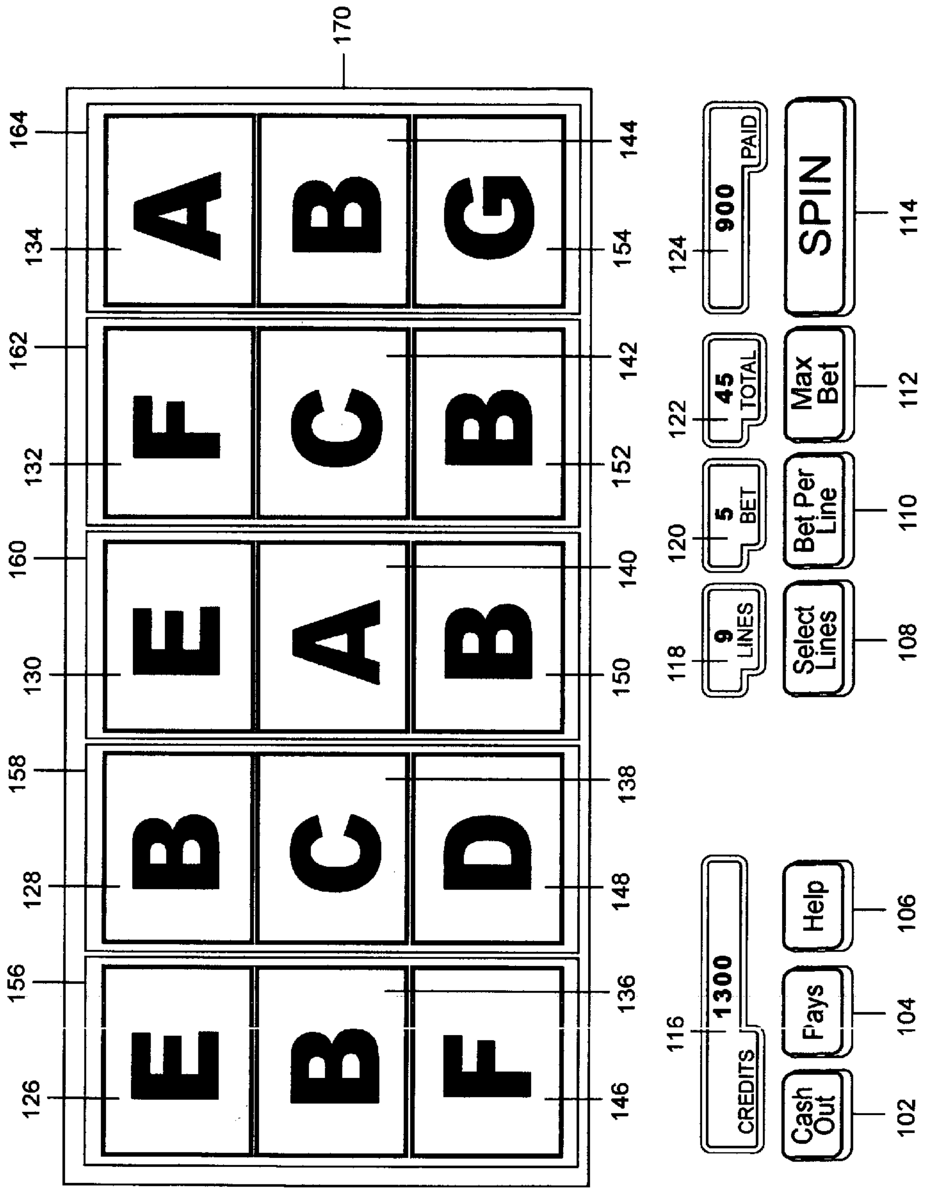
FIG. 10 shows a game screen after all fifteen symbols in the symbol matrix.

The games pauses and then, in FIG. 9, the eighth symbol—"C" at 138—appears in the symbol matrix. The appearance of a different symbol 138 ends the streak at two same symbols 126, 130 appearing sequentially. No award is issued and all of the blinking indicators (not shown) disappear. The game continues to fill-in symbol positions one-at-a-time until all fifteen symbol positions 126-154 are filled, as shown in FIG. 10.

Line Pay & Scatter Pay Awards. In FIG. 10, the player receives line pay and scatter pay awards, if any, for winning combinations formed by the final arrangement of symbols in the symbol matrix 170. Line pay awards issue for two or more, same, adjacent symbols, starting from the leftmost position of a pay line. Scatter pay awards issue awards for two or more, same symbols anywhere in a symbol matrix 170. In FIG. 10, however, the final arrangement of symbols in the symbol matrix 170 does not form any winning combinations of line pay or scatter pay awards.

Pay Schedule. The pay schedule defines the awards for all winning outcomes including: In-A-Row, line pay, and scatter pay awards. Any number of awards may be defined, with any amount assigned to each award. For example, the pay schedule may define the In-A-Row award for four "B" symbols at 20× the total bet; line pay award for three "D" symbols at 10× the bet per line; and scatter pay award for two "G" symbols at 2× the total bet plus 3 free spins. The player may view the pay schedule by using the Pays button 104.

Following issuance of all awards, the cumulative credits are added to the player's balance of credits. In FIG. 10, the 900 awarded credits, as indicated on the Paid meter 124, increase the credit balance to 1300 credits, as shown on the Credit meter 116. As long as the player has credits on the Credit meter 116, the player may continue to play the gaming machine or the player may also collect the balance of credits by pressing the Cash Out button 102. In addition, the player may press the Help button 106 to view the rules of the game.

Figure 11:
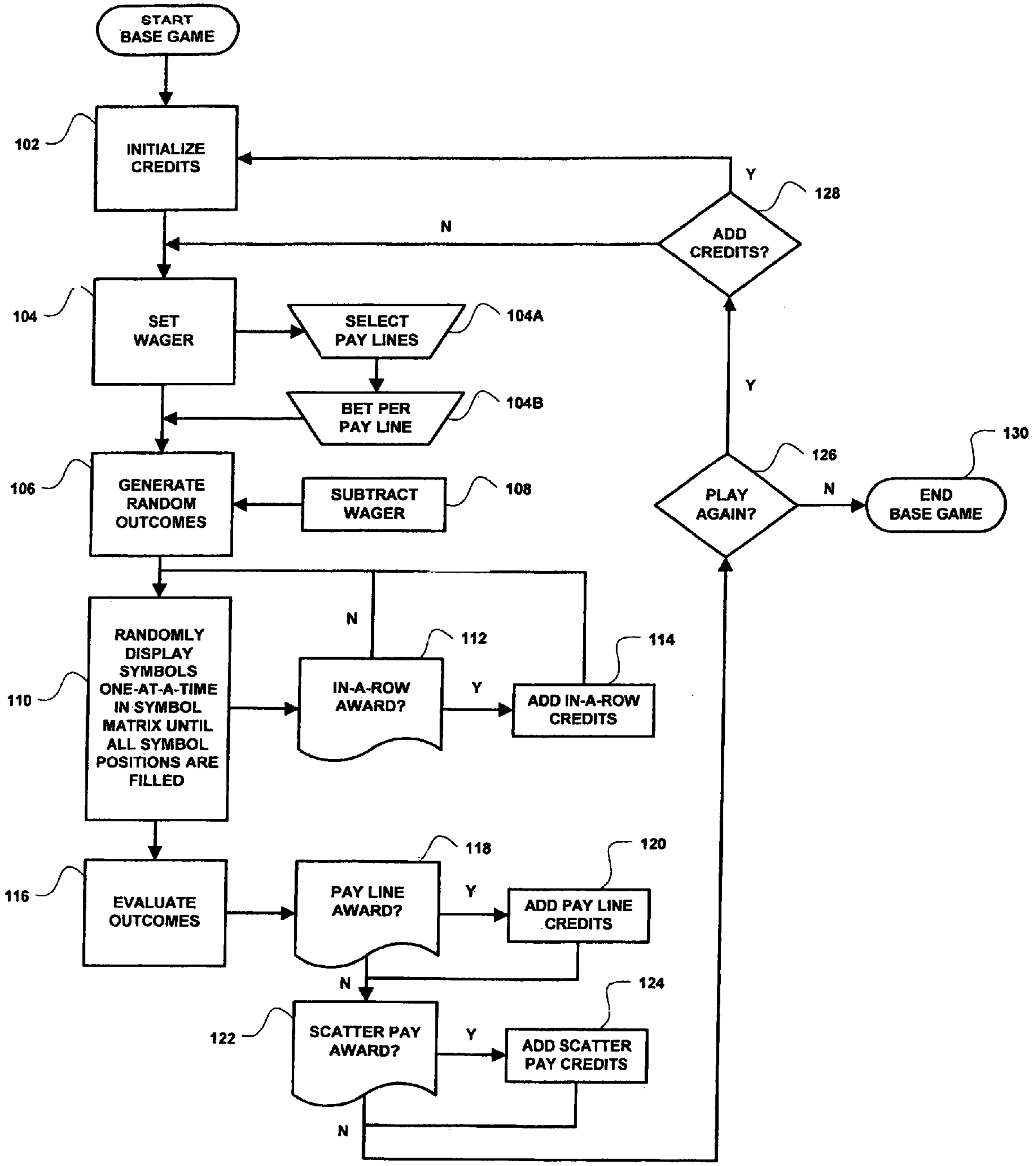
FIG. 11 shows a flowchart diagramming the steps of the preferred In-A-Row embodiment of the present invention.

In addition to the above description, FIG. 11 provides a flowchart which further illustrates the operation of the In-A-Row embodiment of the present invention:

At step 102, the player initializes credits in accordance with a denomination amount. At step 104, the wager is set by using the Select Lines button at step 104(A) to select from one to the maximum number of Pay lines and the Bet per Line button at step 104(B) to bet from one to the maximum number of credits bet per pay line. Alternatively, the values from the previous spin may be used again or the maximum wager may be placed using a Bet Max button (not shown).

At step 106, the symbols in the symbol matrix are randomly rearranged by using the Spin Button and, at step 108, the wager is subtracted from the player's credit total. At step 110, symbols are randomly displayed one-at-a-time until the symbol matrix fills with symbols. With each symbol, In-A-Row awards are determined at 112 and, if any exist, the credits are added to the player's total at step 114.

At step 116, the final arrangement of symbols is evaluated against a pay schedule to evaluate all winning symbol combinations, if any. At step 118, line pay awards are determined and, if any such awards exist, the credits are added to the Player's total at step 120. At step 122, scatter pay awards are determined and, if such awards exist, the credits are added to the player's total at step 124.

Following issuance of all awards, if any, the player decides whether or not to play again at step 126. If the player wants to play again, the game determines if an adequate number of credits exist to place the next wager at step 128. If the credit pool is inadequate, the player may initialize more credits at step 102; or if the credit pool is adequate, then the player may set the wager at step 104. If the player does not want to play again, the game ends at step 130.

DESCRIPTION OF ALTERNATIVE EMBODIMENTS

The present invention may be modified in one or more aspects from the In-A-Row embodiment described above, including but not limited to the following:

In one embodiment, symbols may be displayed in any number of positions of the symbol matrix, including displaying symbols in all positions of the symbol matrix or displaying symbols in a sub-set of positions of the symbol matrix. For example, symbols may only be displayed in positions of the symbol matrix comprising selected pay lines.

In another embodiment, the order of symbol appearance may be in any order, including predetermined, selected by the player, alternating across one or more spins, and/or selected at random from spin to spin. For example, symbols may appear from left to right across the top row, right to left across the middle row, and left to right across the bottom row.

In another embodiment, the order of symbol appearance may be indicated in any manner, including numbering the symbols by their order of appearance, listing the order of symbol appearance on the main or secondary screen, or in any other visual or audio manner. For example, the two same, sequential symbols may result in a "2 In-A-Row" graphic and audio clip.

In another embodiment, only some symbols in the symbol set to form In-A-Row awards, with the subset of symbols predetermined, selected by the player, alternating across one or more spins, and/or selected at random from spin to spin. For example, only "A," "B," and "C" symbols form In-A-Row awards; "D," "E," and "F" symbols do not form In-A-Row awards.

In another embodiment, symbols sharing one or more similar attributes form In-A-Row awards, with the groupings of symbols predetermined, selected by the player, alternating across one or more spins, and/or selected at random from spin to spin. For example, "A1" and "A2" symbols share the "A" attribute and act together to form In-A-Row awards, such as A1-A2-A1-A2.

In another embodiment, any number of a symbol may be required to form In-A-Row awards. For example, at least three "A" symbols or 6 "B" symbols must appear sequentially to form an In-A-Row award. The number of each symbol may be predetermined, selected by the player, alternate across one or more spins, and/or be selected at random from spin to spin.

In another embodiment, wild symbols may replace other symbols to form In-A-Row awards. For example, "B"—"Wild"—"B" may form an In-A-Row award, with the "Wild" symbol acting as a "B" symbol. Also, wild symbols may form In-A-Row awards with other wild symbols. For example, "Wild"—"Wild"—"Wild" may form an In-A-Row award.

In another embodiment, In-A-Row awards may issue credits, free spins, award enhancements, multipliers, prizes, products, and/or services. For example, three "B" symbols may issue an In-A-Row award of free spins. In addition, In-A-Row award types may vary from symbol to symbol. For example, "B" symbols may issue free spins and "C" symbols may issue credits.

In another embodiment, In-A-Row awards may issue any number of credits, free spins, award enhancements, multipliers, prizes, products, and/or services. For example, three "E" symbols may issue an In-A-Row award of 10× the bet per line. Further, In-A-Row award amounts may vary from symbol to symbol. For example, three "E" symbols may issue 10× the bet per line, three "F" symbols may issue 5× the total bet, and three "G" symbols may issue 3 free spins.

In another embodiment, In-A-Row awards may be indicated in any manner, including growing, shrinking, boxing, circling, outlining, glowing, flashing, blinking, and/or rotating the symbol. Moreover, potential In-A-Row awards may also be indicated to the player. For example, two "B" symbols appearing sequentially may be highlighted in anticipation of a third "B" symbol.

In another embodiment, In-A-Row awards may be issued at any time, including at the time of appearance of the symbols, upon filling all symbol positions in the symbol matrix, simultaneous with line pay and scatter pay awards, and/or any other point before, during, or after the spin. For example, In-A-Row awards may be issued after the conclusion of free spins.

In another embodiment, an event during a primary game triggers a secondary game using the present invention, including events such as symbol combinations, wager types or amounts, player selections, and/or at random. For example, a primary slot game may use a symbol combination to trigger a secondary slot game during which In-A-Row awards are issued.

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of playing a slot machine game using a symbol matrix formed by a plurality of rows intersecting with a plurality of columns, with the plurality of rows and columns including a plurality of symbols, comprising:

a. randomly rearranging the plurality of symbols such that any number of same or different symbols may be generated for display in the symbol matrix without displaying said symbols;

b. after randomly rearranging the plurality of symbols, displaying the rearranged symbols, in a non-award stage of the slot machine game, by individual or group placement of the rearranged symbols into the symbols matrix such that all of the rearranged symbols are not simultaneously displayed in the symbol matrix, wherein displaying of the rearranged symbols is repeated until the symbol matrix is entirely filled; and c. after filling the symbol matrix with the rearranged symbols, providing a first award to a player based upon a placement order of the rearranged symbols including a predetermined winning placement order, wherein the placement order is an order in which the rearranged symbols were placed into the symbol matrix, and wherein the first award is not based upon the order in which the rearranged symbols are displayed in the symbol matrix once the symbol matrix in entirely filled.

2. A method of claim 1, wherein providing a first award to the player includes an award of credits for the placement order including, consecutive same symbols, or symbols sharing at least one attribute, as follows:

a. awarding a base credit award for the first consecutive placement of said symbols;

b. increasing the credit award for each subsequent consecutive placement of said symbols; and c. re-setting the credit award to the base value at the conclusion of one or more rounds of play.

3. A method of claim 1, wherein providing a first award to the player includes an award of free games for the placement order including consecutive same symbols.

4. A method of claim 1, wherein providing a first award to the player includes an award of free games for the placement order including consecutive same symbols sharing at least one attribute.

5. A method of claim 1, wherein providing a first award to the player includes an award of free games for the placement order including consecutive same symbols, or symbols sharing at least one attribute, as follows:

a. awarding a base number of free spins for the first consecutive placement of said symbols;

b. increasing the number of free spins for each subsequent consecutive placement of said symbols; and c. re-setting the number of free spins to the base number at the conclusion of one or more rounds of play.

6. A method of claim 1, wherein providing a first award to the player includes an award of an award enhancer for the placement order including consecutive same symbols, or symbols sharing at least one attribute, in the symbol matrix.

7. A method of claim 1 wherein providing a first award to the player includes an award of an award enhancer for the placement order including consecutive same symbols or symbols sharing at least one attribute as follows:

a. awarding a base award enhancer value for the first consecutive placement of said symbols;

b. increasing the award enhancer value for each subsequent consecutive placement of said symbols;

c. the award enhancer affecting the value of second awards issued for line pays formed during the game;

d. the award enhancer affecting the value of third awards issued for scatter pays formed during the game; and e. re-setting the award enhancer to the base value at the conclusion of one or more rounds of play.

8. A method of playing a slot machine game using a symbol matrix formed by a plurality of rows intersecting with a plurality of columns, with the plurality of rows and columns including a plurality of symbols, comprising:

a. placing a wager to initiate the game;

b. randomly rearranging the plurality of symbols such that any number of same or different symbols may be generated for display in the symbol matrix without displaying said symbols;

c. after randomly rearranging the plurality of symbols, displaying the rearranged symbols, in a non-award stage of the slot machine game, one-at-a-time into the symbol matrix such that all of the rearranged symbols are not simultaneously displayed in the symbol matrix, wherein displaying of the rearranged symbols is repeated until the symbol matrix is entirely filled;

d. after filling the symbol matrix with the rearranged symbols, providing a first award to a player based upon a placement order of consecutive same symbols, but not upon the order in which the said symbols are displayed in the symbol matrix once the symbol matrix in entirely filled, as follows:

i. awarding a credit award for a first consecutive placement of said same symbols;

ii. increasing said credit award for each subsequent consecutive placement of said same symbols; and iii. re-setting said credit award to the base value at the conclusion of one or more rounds of play.

9. A method of playing a secondary bonus game for a slot machine game using a symbol matrix formed by a plurality of rows intersecting with a plurality of columns, with the plurality of rows and columns including a plurality of symbols, comprising:

a. achieving one or more pre-determined outcomes in the base game to initiate the secondary bonus game;

b. randomly rearranging the plurality of symbols such that any number of same or different symbols may be generated for display in the symbol matrix without displaying said symbols;

c. after randomly rearranging the plurality of symbols, displaying the rearranged symbols, in a non-award stage of the slot machine game, one-at-a-time into the symbol matrix such that all of the rearranged symbols are not simultaneously displayed in the symbol matrix, wherein displaying of the rearranged symbols is repeated until the symbol matrix is entirely filled;

d. after filling the symbol matrix with the rearranged symbols, providing a first award to a player based upon a placement order of consecutive same symbols, but not upon the order in which the said symbols are displayed in the symbol matrix once the symbol matrix in entirely filled, as follows:

i. awarding an initial award enhancer value for a first consecutive placement of said same symbols;

ii. increasing said award enhancer value for each subsequent consecutive placement of said same symbols;

iii. said award enhancer value affecting the value of any or all subsequent awards issued; and iv. re-setting said award enhancer value to the initial value at the conclusion of one or more rounds of play.

* * * * *